Dec. 28, 1965 E. W. ANTHON 3,225,628

TURNTABLE DRIVE

Filed Feb. 26, 1962 2 Sheets-Sheet 1

INVENTOR.
ERIK W. ANTHON
BY Schapp & Hatch
ATTORNEYS

INVENTOR.
ERIK W. ANTHON
BY
Schapp & Hatch
ATTORNEYS

United States Patent Office
3,225,628
Patented Dec. 28, 1965

3,225,628
TURNTABLE DRIVE

Erik W. Anthon, Kensington, Calif., assignor, by mesne assignments, to Warner-Lambert Pharmaceutical Company, Morris Plains, N.J.

Filed Feb. 26, 1962, Ser. No. 175,716
5 Claims. (Cl. 74—822)

Figure 1:
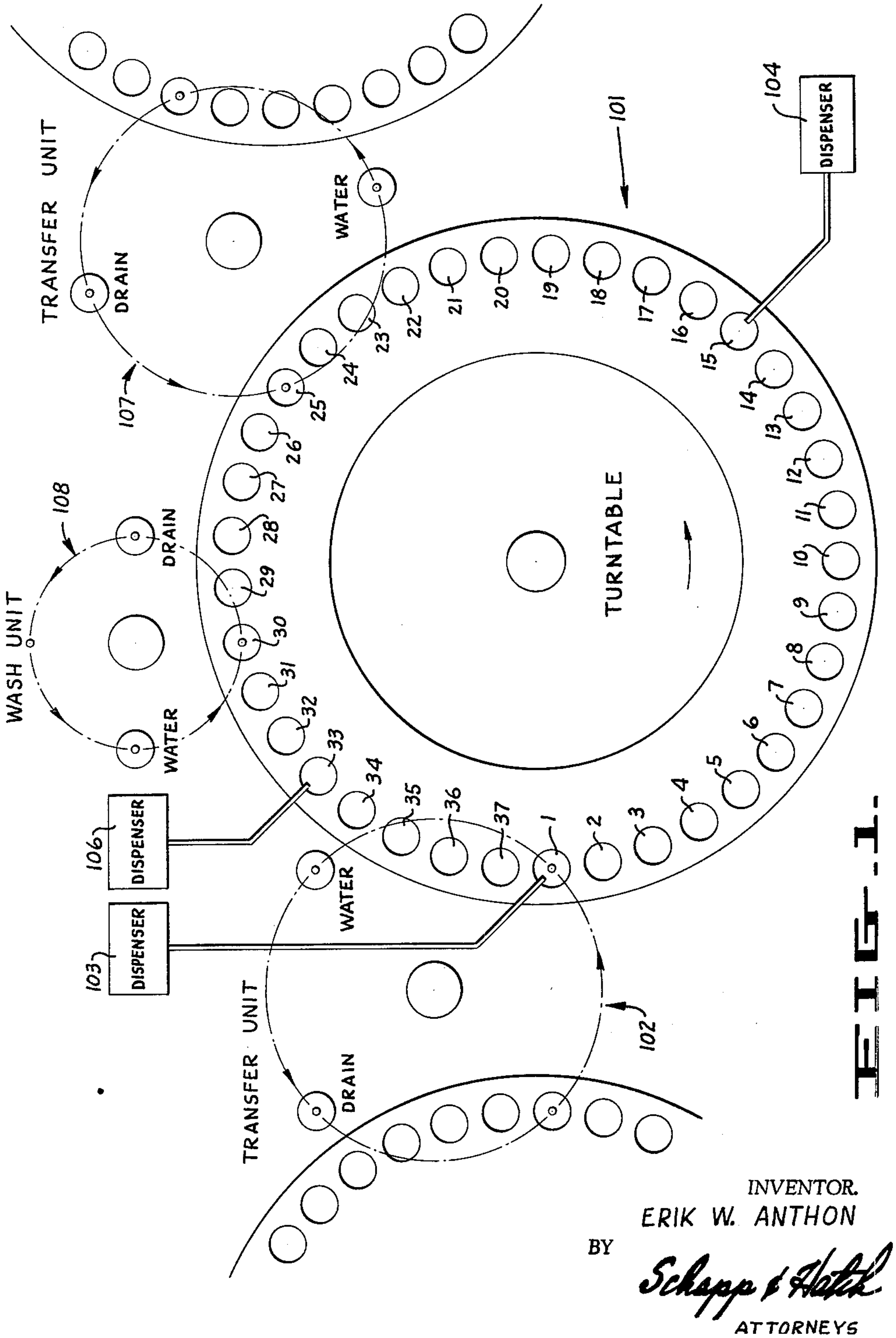

The present invention relates to improvements in a turntable drive and more particularly to a turntable drive which is alternately rotated and halted so as to present stations on the turntable in fixed positions with relation to fixed positions outside the turntable.

In prior turntables, it is known that drive means can be provided to advance the turntable one step at a time from one station to another and stop it between movements so as to facilitate transfer of material or other operations at the station. Such turntable drives may be adapted to a wide variety of applications. However, these turntables are particularly valuable in handling materials where accurate operations are required such as are encountered in automatic analytic equipment.

While programming of the drive means to advance one step at a time is satisfactory for many operations, it is sometimes desirable to provide irregular movements whereby a turntable or the like may be advanced one station or a multiple of one station and then advanced a multiple of stations different than the first movement. Such irregular movement has particular value in providing a wide area of programming for automatic analytic equipment as will become clear as the description proceeds.

Accordingly, it is a primary object of this invention to provide a turntable drive capable of driving the turntable variable numbers of stations between stops according to a preset program.

Another object of the invention is to provide a turntable drive capable of positioning certain stations on the turntable with respect to stationary stations in a programmed manner whereby the length of time stations are traveling from a given stationary station back to the same station or another fixed station is adjustable to provide various and improved residence times according to optimum requirements.

A further object of the invention is to provide a turntable drive of the character described which is simple in construction, efficient in operation and economical to construct and operate.

Still another object of the invention is to provide a turntable drive of the character described which may be easily adjusted to change the programming when desired.

Further objects and advantages of my invention will be apparent as the specification progresses, and the new and useful features of my turntable drive will be fully defined in the claims attached hereto.

In general, the turntable drive of this invention comprises a gear adapted to rotate the turntable through an angle directly proportional to the rotation of the gear, and means for driving the gear through different angles of forward rotation. The turntable will have a plurality of stations equally spaced around the periphery thereof which may hold test tubes or sample tubes. Corresponding to each station is a cog or like element adapted to be driven by the gear so that advance of one cog corresponds with advance of one station. The means for driving the gear may be a cam having adjustable or removable drive elements which may be set according to the desired program.

Figure 2:
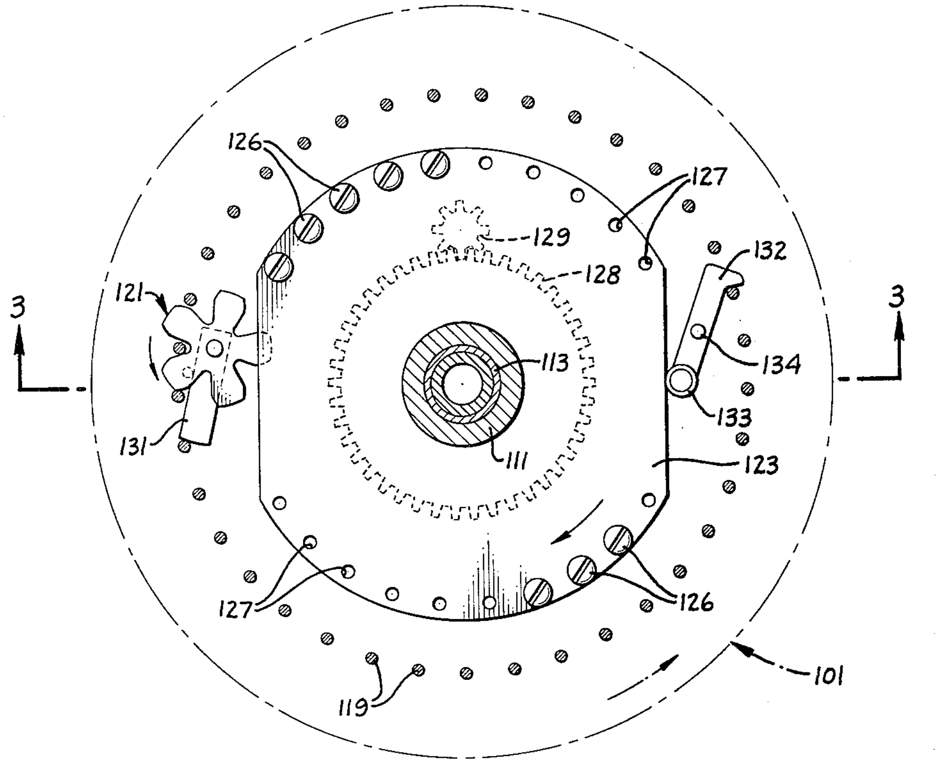
Figure 3:
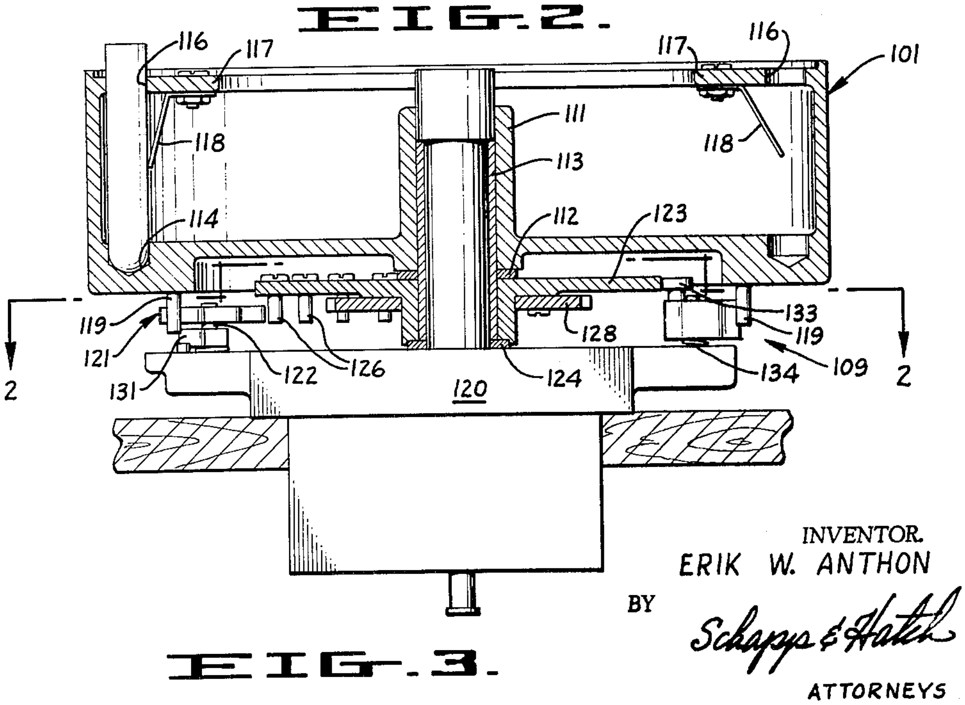

The preferred form of the invention is shown in the accompanying drawings, forming a part of this specification, in which:

FIGURE 1 is a schematic plan view of a turntable to be driven by the turntable drive of this invention;

FIGURE 2, a top sectional view of a turntable and drive system of the present invention taken in the line 2—2 of FIGURE 3; and FIGURE 3, a cross-sectional view of a turntable and drive system of this invention taken in the plane of line 3—3 of FIGURE 2.

While I have shown only the preferred form of my invention, it should be understood that various changes or modifications may be made within the scope of the claims attached hereto without departing from the spirit of the invention.

Referring to the drawings in detail, there is shown a turntable 101 having a plurality of equally spaced stations around the periphery thereof. At each station a sample tube or test tube may be secured in place, or if desired other pieces of equipment may be provided at any or all of the stations. In the system herein illustrated, there are 37 stations numbered consecutively from 1 to 37 on the turntable, see FIGURE 1. Each station carries sample tubes which are also numbered 1 to 37 according to the station. Although 37 stations and sample tubes are shown, it is to be understood that the number may be varied according to requirements without departing from the invention.

The stations on the turntable rotate therewith, but they also have corresponding positions outside and adjacent to the turntable which are stationary positions. These stationary positions will be referred to herein as reference positions 1 through 37. Various pieces of equipment may be placed at these reference positions according to the requirements of the system. In FIGURE 1 there is shown a transfer unit 102 which transfers sample from an adjacent turntable to the sample tube in reference position 1 of turntable 101.

Other pieces of equipment that deliver material to the sample include dispenser 103 that delivers at reference position 1, dispenser 104 that delivers at reference position 15 and dispenser 106 that delivers at reference position 33. The sample is removed from the sample tubes at reference position 25 by transfer unit 107, and the sample tubes are washed at reference station 30 by wash unit 108.

The turntable drive shown herein is programmed to drive the turntable alternately ahead three stations and then five. For example, sample tube 1 will advance from the position shown in FIGURE 1 from stationary position 1 to position 6, then to position 9, then 14 and so on through positions 17, 22, 25, 30, 33, to 1. Sixty-five moves later it will be back at station 1 again to complete the entire cycle. Thus each tube or station arrives twice at each position during each complete cycle in a manner which provide stops at various positions around the turntable so as to give freedom in programming addition of reagents or the like and the proper timing between operations.

This movement is provided by the novel drive system of the invention which is also easily adapted to provide other alternate movements. Referring particularly to FIGURE 3, there is shown turntable 101 mounted for rotation on turntable drive 109. The turntable is constructed in a pan-like configuration so as to carry water and act as a water bath. Rotation is provided at central hub 111 which is supported on thrust bearing 112 and rotatable around sleeve bearing 113. The sample tubes are held in place at their respective stations by depressions 114 in the base of the turntable and holes 116 or openings in inner flange 117 or the like at the top of the turntable. The tubes are held tightly in position by spring fingers 118 which depend from flange 117.

Other structures may be provided on the turntable such as a cover, means for passing water through the pan and/or means for controlling the temperature of the water. However none of these structures interfere with or add to the novel turntable drive.

Rotation and holding of the turntable is accomplished through cogs or pins 119 which depend from the base of turntable 101 and correspond in number and angular position to the turntable stations. Accordingly, there are 37 pins equally spaced around the base of the turntable. Rotation of the pins is provided by gear 121 which is mounted for free rotation on bearing 122 secured to frame 120. Each advance of a tooth of gear 121 rotates the turntable ahead one station by cooperation with pin 119. Instead of cogs or pins 119, teeth of a planetary gear or other equivalent could be used. The important feature is the translation of rotary motion so as to provide advance of one station per advance of each tooth of gear 121.

The means for driving the gear 121 and cogs 119 engageable therewith are carried on a cam 123 mounted for rotation around sleeve bearing 113 and held on thrust bearing 124. These means comprise a changeable number of pins 126 which are threaded at their head end for fastening into threaded holes 127 with ten on each side of cam 123. Thus there may be any number of pins from one to ten on each side.

The holes 127 and pins 126 carried therein are spaced in arcuate fashion on the cam so that the pins engage the gear 121 on rotation of the cam. Thus with three and five pins in the groups, the gear and turntable are rotated alternately through three and five moves. In the usual operation, the cam is rotated at a constant speed, and the period of dwell is the time between the drive of the last pin of one group and the first pin of the next group.

Rotation of the cam 123 is provided through gear 128 which is attached thereto as shown. The gear is rotated by drive gear 129 which is driven by an electric motor (not shown). In the drive illustrated, the turntable is driven in reverse rotation with respect to the cam, and means are provided to prevent retrograde motion which might otherwise occur through the low friction thrust bearing 112.

As shown in FIGURE 2, the means for preventing retrograde motion may be a pawl 131 carried on bearing 122 along with gear 121. As a pin 126 drives gear 121, the pawl 131 is pushed aside to allow a cog or pin 119 to pass and then snaps back under spring tension or the like carried in its mounting as the cog passes the end. This occurs simultaneously with the passage of the drive pin 126 away from the gear 121.

The tendency for retrograde motion is important to position the turntable in exactly the correct position for operations to be properly accomplished at the various stations. In other words, precise indexing of the turntable is achieved by the cooperation of the direct drive through gear 121 to position cogs 119 beyond pawl 131 and the tendency of reverse drive through low friction bearing 112 to hold the turntable against the pawl.

Between movements, the turntable is also locked against forward movement by a pawl 132 carried on a cam follower 133 which is spring pressed against the surface of cam 123 through a spring pivot on mounting 134. This provides complete locking during a period of time between movements so as to allow operations to be conducted at certain of the reference positions.

In its preferred form the turntable is halted after each movement provided by one half revolution of cam 123. This halting may conveniently be accomplished by members (not shown) on the cam which contact switches (not shown). The cam may then be stopped according to desired periods of time to complete any desired operations. For example, transfer unit 102 may be constructed according to my copending United States Patent No. 3,151,073, entitled "Fluid Handling Apparatus," and the operation indexed as described therein. However it should be understood that other systems may be used with the turntable drive of this invention, and such systems may be indexed through suitable control means to provide the desired period of time that the cam and turntable are stationary.

From the foregoing description, it is apparent that the drive may be easily adjusted to provide alternative movements of various stations. Other programs that may be used to advantage with a turntable having 37 stations include alternate movements of 3 and 7, and alternate movements of 1 and 3. Obviously, turntables having a different number of stations could be used, if desired. In addition, the drive may have a cam divided into three or four sections, instead of two. In such cases, programs utilizing three or four different advances in sequence may be effected.

For most purposes, alternate moves will provide the desired results and the drive unit described is preferred. In addition, the unit may be used to advantage when temperature control or other operations of time duration are required so as to provide the desired residence times without unduly slowing down the operation of the unit.

Referring again to FIGURE 1, movement of the sample tubes into and out of position at reference position 1 are shown in Table I below. From the table it is seen that a complete cycle comprises eight revolutions of the turntable with each sample arriving at a given station one revolution after a first appearance and then seven revolutions later. The second such appearance is underlined in the table.

*Table I*

| Complete Turntabke Revolutions | Sample Tube at Reference Station 1 | | | | | | | | | | |
|---|---|---|---|---|---|---|---|---|---|---|---|
| 1 | 1 | $\underline{33}$ | 30 | $\underline{25}$ | 22 | $\underline{17}$ | 14 | $\underline{9}$ | 6 | $\underline{1}$ | |
| 2 | 35 | $\underline{30}$ | 27 | $\underline{22}$ | 19 | $\underline{14}$ | 11 | $\underline{6}$ | 3 | | |
| 3 | $\underline{35}$ | 32 | $\underline{27}$ | 24 | $\underline{19}$ | 16 | $\underline{11}$ | 8 | $\underline{3}$ | | |
| 4 | 37 | $\underline{32}$ | 29 | $\underline{24}$ | 21 | $\underline{16}$ | 13 | $\underline{8}$ | 5 | | |
| 5 | $\underline{37}$ | 34 | $\underline{29}$ | 26 | $\underline{21}$ | 18 | $\underline{13}$ | 10 | $\underline{5}$ | 2 | |
| 6 | | $\underline{34}$ | 31 | $\underline{26}$ | 23 | $\underline{18}$ | 15 | $\underline{10}$ | 7 | $\underline{2}$ | |
| 7 | | 36 | $\underline{31}$ | 28 | $\underline{23}$ | 20 | $\underline{15}$ | 12 | $\underline{7}$ | 4 | |
| 8 | | $\underline{36}$ | 33 | $\underline{28}$ | 25 | $\underline{20}$ | 17 | $\underline{12}$ | 9 | $\underline{4}$ | 1 |

From Table I above it is seen that every sample tube arrives at every reference position, and that these arrivals are alternately spaced at 9 moves and then 65 moves. It is also seen that operations may be accomplished at various positions around the turntable and still be fit into the desired order.

In table II below, there is shown the movement of a given sample tube according to the sequence of reference positions through which it travels. This sequence is the same for all sample tubes; however sample tube 1 will be used for illustration. Again the second appearance (the appearance one revolution after the first) is shown underline.

*Table II*

| Complete Turntable Revolutions | Reference Station of Sample Tube 1 | | | | | | | | | | | |
|---|---|---|---|---|---|---|---|---|---|---|---|---|
| 1 | 1 | $\underline{6}$ | 9 | $\underline{14}$ | 17 | $\underline{22}$ | 25 | $\underline{30}$ | 33 | | | |
| 2 | $\underline{1}$ | 4 | $\underline{9}$ | 12 | $\underline{17}$ | 20 | $\underline{25}$ | 28 | $\underline{33}$ | 36 | | |
| 3 | | $\underline{4}$ | 7 | $\underline{12}$ | 15 | $\underline{20}$ | 23 | $\underline{28}$ | 31 | $\underline{36}$ | | |
| 4 | | 2 | $\underline{7}$ | 10 | $\underline{15}$ | 18 | $\underline{23}$ | 26 | $\underline{31}$ | 34 | | |
| 5 | | $\underline{2}$ | 5 | $\underline{10}$ | 13 | $\underline{18}$ | 21 | $\underline{26}$ | 29 | $\underline{34}$ | 37 | |
| 6 | | | $\underline{5}$ | 8 | $\underline{13}$ | 16 | $\underline{21}$ | 24 | $\underline{29}$ | 32 | $\underline{37}$ | |
| 7 | | | 3 | $\underline{8}$ | 11 | $\underline{16}$ | 19 | $\underline{24}$ | 27 | $\underline{32}$ | 35 | |
| 8 | | | $\underline{3}$ | 6 | $\underline{11}$ | 14 | $\underline{19}$ | 22 | $\underline{27}$ | 30 | $\underline{35}$ | 1 |

An example of a processing of a sample that might be utilized with the present set-up involves the sample being introduced at reference position 1 by transfer unit 102 which brings in sample and reagent alternately. Starting at the reference station 1, sample is received and the sample moves as shown in Table II through positions 25 and 30 where it is left in (transfer at station 107 and wash unit 108 operating alternately). At position 33 and on return to position 1 reagent is added. At the next arrival at 25, the sample is removed. Several revolutions later, the tube is washed at position 30, two moves ahead of the beginning at position 1 for another cycle.

In a preferred operation, the sample and reagents are retained for a longer period. In this case, fully treated sample goes through position 1 where it picks up a final addition of reagent. On arrival at position 25 (six moves later), it is removed to another turntable by transfer unit 107 for analysis or further treatment. One move later, the sample tube is washed at wash unit 108 so as to be ready to pick up a new sample at station 1 two moves later.

From Table II progress may be followed where it is seen that reagent is received at position 33 from dispenser 106 (removal at position 25 being skipped). Another reagent is added at position 15 at either pass, and on through the sequence to position 1 where it picks up a final addition of reagent as mentioned above.

In the latter example, it is seen that the sample remains in place on the turntable through 71 moves with only three moves being used between samples. In this way it is possible to space transfer stations and still utilize residence time in the turnable to the fullest extent.

From the above description, it is seen that I have provided a turntable drive capable of providing an adjustable irregular movement that provides improved flexibility in programming movement of the turntable.

I claim:

1. In a turntable apparatus for holding and conveying containers adapted to carry analytical sample between stations, in combination, a turnable drive for rotating the turntable between a plurality of stations and stopping the same at individual stations according to a predetermined program, comprising a shaft, a turntable rotatably mounted on the shaft, a gear adapted to rotate the turntable through an angle directly proportional to the rotation of the gear, means associated with the gear to prevent reverse rotation of the turntable, a cam mounted for rotation on the shaft in position to drive said gear, means for rotating the cam, means activated by the cam to hold the turntable against forward rotation during an arc of rotation of said cam, and pins carried on said cam in position so as to engage said gear on rotation of the cam, said pins being spaced so as to provide at least two groups of different numbers of pins whereby the gear is driven through different angles of forward rotation.

2. In a turntable apparatus for holding and conveying containers adapted to carry analytical sample between stations, in combination, a drive system for the turntable having a plurality of equally spaced stations around the periphery thereof, comprising a plurality of cogs on said turntable corresponding in number and angular spacing to the equally spaced stations on the turntable, a gear in engagement with said cogs for rotating the turntable, a cam, means for rotating the cam, means carried on the cam for driving the gear and cogs engageable therewith alternately through two fixed numbers of cogs with the gear movement being alternately interrupted whereby the turntable is alternately advanced two predetermined different numbers of stations and stopped between each advance, means associated with the gear to prevent reverse rotation of the turntable, and means actuated by the cam to hold the turntable against forward rotation during an arc of rotation of said cam.

3. In a turntable apparatus for holding and conveying containers adapted to carry analytical sample between stations, in combination, a drive system for the turntable having a plurality of equally spaced stations around the periphery thereof, comprising a plurality of cogs on said turntable corresponding in number and angular spacing to the equally spaced stations on the turntable, a gear in engagement with said cogs for rotating the turntable, a pawl carried on said gear to prevent reverse rotation of the cogs, means for alternately driving the gear through two different angles of rotation in the same direction of rotation with the angles of rotations each being whole number multiples of the angle required to advance the turntable one station, and means actuated by the cam to hold the turntable against forward rotation during an arc of rotation of said cam.

4. A drive system for a turntable having a plurality of equally spaced stations around the periphery thereof, comprising a plurality of cogs on said turntable corresponding in number and angular spacing to the equally spaced stations on the turntable, a gear in engagement with said cogs for rotating the turntable, a pawl carried on said gear to prevent reverse rotation of the cogs, a cam, means for rotating the cam, pins removably carried on said cam so as to engage said gear on rotation of the cam, said pins each moving the gear an amount to provide advance of one cog engageable with said gear and said pins also being spaced so as to provide at least two different sized groups of pins on opposed sides of the cam, and means actuated by the cam to hold the turntable against forward rotation during an arc of rotation of said cam.

5. A drive system for a turntable having a plurality of equally spaced stations around the periphery thereof, comprising a plurality of cogs on said turntable corresponding in number and angular spacing to the equally spaced stations on the turntable, a gear in engagement with said cogs for rotating the turntable, a pawl carried on said gear to prevent reverse rotation of the cogs, a cam, means for rotating the cam, pins removably carried on said cam so as to engage said gear on rotation of the cam, said pins each moving the gear an amount to provide advance of one cog engageable with said gear and said pins also being spaced so as to provide at least two different sized groups of pins on opposed sides of the cam, a cam surface on the cam which varies from the circular at opposed sides of the cam between the opposed group of pins, and a cam follower adapted to ride on said surface and hold the turntable against rotation when the follower is against said cam surface that varies from the circular whereby the turntable is held to present stationary stations at fixed positions between the programmed rotation effected by the pins.

References Cited by the Examiner

UNITED STATES PATENTS

| | | | |
|---|---|---|---|
| 2,985,038 | 5/1961 | Tandler | 74—815 |
| 3,057,215 | 10/1962 | Stewart | 74—820 X |
| 3,085,452 | 4/1963 | Thompson | 74—822 |

FOREIGN PATENTS

| | | |
|---|---|---|
| 776,104 | 10/1934 | France. |

BROUGHTON G. DURHAM, *Primary Examiner.*

DON A. WAITE, MILTON KAUFMAN, *Examiners.*

Dedication

3,225,628.—*Erik W. Anthon*, Kensington, Calif. TURNTABLE DRIVE. Patent dated Dec. 28, 1965. Dedication filed Mar. 2, 1970, by the assignee, *American Optical Corporation.*

Hereby dedicates the remaining term of said patent to the Public.

[*Official Gazette July 7, 1970.*]